(12) United States Patent
Sienkiewicz et al.

(10) Patent No.: US 11,496,909 B2
(45) Date of Patent: Nov. 8, 2022

(54) SCALABLE TEST MODEL FOR CELLULAR COMMUNICATION SYSTEM THAT SUPPORTS DIFFERENT BANDWIDTH AND SUBCARRIER SPACING COMBINATIONS

(71) Applicant: Telefonaktiebolaget LM Ericsson (publ), Stockholm (SE)

(72) Inventors: Esther Sienkiewicz, Ottawa (CA); Senay Negusse, Åkersberga (SE); Thomas Chapman, Solna (SE); Robert Baldemair, Solna (SE); Farshid Ghasemzadeh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 17/251,332

(22) PCT Filed: Jun. 11, 2019

(86) PCT No.: PCT/IB2019/054865
§ 371 (c)(1),
(2) Date: Dec. 11, 2020

(87) PCT Pub. No.: WO2019/239318
PCT Pub. Date: Dec. 19, 2019

(65) Prior Publication Data
US 2021/0258801 A1    Aug. 19, 2021

Related U.S. Application Data

(60) Provisional application No. 62/689,571, filed on Jun. 25, 2018, provisional application No. 62/683,471, filed on Jun. 11, 2018.

(51) Int. Cl.
*H04B 17/391* (2015.01)
*H04W 16/22* (2009.01)
(Continued)

(52) U.S. Cl.
CPC ........ *H04W 16/22* (2013.01); *H04B 17/0085* (2013.01); *H04B 17/3912* (2015.01); *H04W 24/06* (2013.01)

(58) Field of Classification Search
CPC .. H04W 16/22; H04W 24/06; H04B 17/0085; H04B 17/3912; H04B 17/13; H04B 17/10
See application file for complete search history.

(56) References Cited

U.S. PATENT DOCUMENTS

| | | | | |
|---|---|---|---|---|
| 2014/0126380 | A1* | 5/2014 | Kazmi | H04W 72/04 370/241 |
| 2020/0021419 | A1* | 1/2020 | Taherzadeh Boroujeni | H04L 5/0053 |
| 2020/0186206 | A1* | 6/2020 | Estella Aguerri | H04W 88/085 |

FOREIGN PATENT DOCUMENTS

| | | |
|---|---|---|
| CN | 104823261 A | 8/2015 |
| CN | 106850167 A | 6/2017 |

(Continued)

OTHER PUBLICATIONS

3GPP TSG-RAN WG4 #86bis R4-1804989, Source: Ericsson, Title: NR Test Models Melbourne, Australia Apr. 16-20, 2018 (Year: 2018).*

(Continued)

*Primary Examiner* — Edan Orgad
*Assistant Examiner* — Malick A Sohrab
(74) *Attorney, Agent, or Firm* — Withrow & Terranova, PLLC

(57) ABSTRACT

Systems and methods for a scalable test model for a cellular communications system having multiple different bandwidth and subcarrier combinations are disclosed. Embodiments of a method performed by a test node and corresponding embodiments of a test node are disclosed. In some embodiments, a method performed by a test node comprises generating a test signal for a particular bandwidth and (Continued)

subcarrier spacing combination, the test signal being in accordance with a test model that is scalable for a plurality of different bandwidth and subcarrier spacing combinations. By using the scalable test model, the test model can be flexibly used to test for different bandwidth and subcarrier spacing combinations.

12 Claims, 11 Drawing Sheets

(51) Int. Cl.
*H04B 17/00* (2015.01)
*H04W 24/06* (2009.01)

(56) References Cited

FOREIGN PATENT DOCUMENTS

| WO | 2018063997 A1 | | 4/2018 |
|---|---|---|---|
| WO | WO-2018063997 A1 | * | 4/2018 |

OTHER PUBLICATIONS

3GPP TSG-RAN WG4 Meeting #87 R4-1807872; Source Nokia, Nokia Shanghai Bell; Title NR Test models; Busan, Korea (Republic of), May 21-25, 2018 (Year: 2018).*
3GPP TS 36.141 V15.2.0 (Mar. 2018), 3rd Generation Partnership Project; Technical Specification Group Radio Access Network; Evolved Universal Terrestrial Radio Access (E-UTRA); Base Station (BS) conformance testing (Year: 2018).*
First Office Action for Chinese Patent Application No. 201980038496. 2, dated Apr. 13, 2022, 15 pages.
Author Unknown, "Technical Specification Group Radio Access Network; Evolved Universal Terrestrial Radio Acces (E-UTRA); Base Station (BS) conformance testing (Release 15)," Technical Specification 36.141, Version 15.2.0, 3GPP Organizational Partners, Mar. 2018, 437 pages.
Author Unknown, "Technical Specification Group Radio Access Network; NR; Base Station (BS) radio transmission and reception (Release 15)," Technical Specification 38.104, Version 15.2.0, 3GPP Organizational Partners, Mar. 2018, 133 pages.
Author Unknown, "Technical Specification Group RAN; NR; Base Station (BS) conformance testing Part 1: Conducted conformance testing (Release 15)," Technical Specification 38.141-1, Version 0.2.0, 3GPP Organizational Partners, May 2018, 32 pages.
Author Unknown, "Technical Specification Group RAN; NR; Base Station (BS) conformance testing Part 2: Radiated conformance testing (Release 15)," Technical Specification 38.141-2, Version 0.1.0, 3GPP Organizational Partners, May 2018, 39 pages.
Ericsson, "R4-1804989: NR Test Models," Third Generation Partnership Project (3GPP), TSG-RAN WG4 #86bis, Apr. 16-20, 2018, 3 pages, Melbourne, Australia.
Huawei, et al., "R4-1807852: Test models for NR base station conformance testing," Third Generation Partnership Project (3GPP), TSG RAN WG4 Meeting #87, May 21-25, 2018, 5 pages, Busan, Korea.
Nokia, et al., "R4-1807872: NR Test models," Third Generation Partnership Project (3GPP), TSG-RAN WG4 Meeting #87, May 21, 2018, 7 pages, Busan, Korea.
Nokia, et al., "R4-1808320: WF on test models for NR conformance test," Third Generation Partnership Project (3GPP), TSG-RAN WG4 Meeting #87, May 21-25, 2018, 4 pages, Busan, Korea.
International Search Report and Written Opinion for International Patent Application No. PCT/IB2019/054865, dated Oct. 16, 2019, 13 pages.

* cited by examiner

SCALABLE TEST MODEL FOR CELLULAR COMMUNICATION SYSTEM THAT SUPPORTS DIFFERENT BANDWIDTH AND SUBCARRIER SPACING COMBINATIONS

RELATED APPLICATIONS

This application is a 35 U.S.C. § 371 national phase filing of International Application No. PCT/IB2019/054865, filed Jun. 11, 2019, which claims the benefit of provisional patent application Ser. No. 62/683,471, filed Jun. 11, 2018 and provisional patent application Ser. No. 62/689,571, filed Jun. 25, 2018, the disclosures of which are hereby incorporated herein by reference in their entireties.

TECHNICAL FIELD

The present disclosure relates to conformance testing for a cellular communications system and, in particular, to a scalable test model for a cellular communications system for different combinations of bandwidths and subcarrier spacings.

BACKGROUND

New Radio (NR) has introduced new aspects into mobile communication, one of which is the addition of multiple different Subcarrier Spacings (SCSs) and the addition of new bandwidths at sub 6 gigahertz (GHz) frequencies (FR1) and also at millimeter wave, 28 GHz bands (FR2). The intention of the different SCSs is to provide flexibility for support of new applications such as Ultra-Reliable and Low Latency Communication (URLLC) and Internet of Things (IoT) and to cover the large frequency range from sub-1 GHz up to 100 GHz.

A scaling approach (based on a scaling factor $2^N$, N=0, 1, 2, ... ) is considered for deriving SCSs for NR: 15 kilohertz (kHz), 30 kHz, 60 kHz, 120 KHz, 240 KHz, etc. The numerology-specific time resource durations (slots) can then be determined in milliseconds (ms) based on the SCS: SCS of $2^N*15$ kHz gives $\frac{1}{2}^N$ ms. Regarding the slot duration, a small deviation can occur due to the first symbol every 0.5 ms having a slightly larger Cyclic Prefix (CP). Table 1 illustrates example numerologies for NR in terms of SCS, slot duration, symbol duration, CPlength, etc.

TABLE 1

Examples of numerologies in NR assuming normal CP length

| | Numerology attribute Numerology parameter values Subcarrier spacing | | | | |
|---|---|---|---|---|---|
| | 15 kHz | 30 kHz | 60 kHz | 120 kHz | 240 kHz |
| Slot duration | 500 μs | 250 μs | 125 μs | 62.5 μs | 31.25 μs |
| OFDM symbol, duration | 66.67 μs | 33.33 μs | 16.67 μs | 8.335 μs | 4.1675 μs |
| Cyclic prefix, duration | 4.76 μs | 2.38 μs | 1.19 μs | 0.595 μs | 0.2975 μs |
| OFDM symbol including cyclic prefix | 71.43 μs | 35.71 μs | 17.86 μs | 8.93 μs | 4.465 μs |

In addition to different numerologies, NR also supports—depending on numerology—different channel bandwidths. The maximum channel bandwidth is, on one hand, given by Radio Access Network 1 (RAN1) (not more than 3300 active subcarriers) and, on the other hand, given by RAN4 which specifies channel bandwidth for different numerologies. The maximum channel bandwidths are 100 and 400 megahertz (MHz) for FR1 and FR2, respectively.

The Third Generation Partnership Project (3GPP) RAN4 base station specifications comprise two parts, namely, so-called core requirements, which are generic requirements applicable during all operation modes, and conformance requirements, which specify details of specific tests that are performed to demonstrate compliance to the core requirements. The core requirements specification contains a set of so-called Test Models (TMs). For Evolved Universal Terrestrial Radio Access (E-UTRA), the TMs comprise a detailed description of Long Term Evolution (LTE) physical layer parameterization, including individual channels with parameters and power levels. The standardization of test models means that standardized transmitter signals are available, which enables consistency when testing transmitter requirements. The existing TMs for LTE are individually specified in detail for each LTE bandwidth.

The addition of the flexibility into NR compared to LTE leaves new challenges for conformance testing. In addition, the flexibility in supported bandwidths and SCS would result in an excessive number of permutations. The design of the test must provide enough test coverage for base station performance but also for regulatory bodies all over the world issuing spectrum licenses for operators to deploy NR systems and should handle the challenge with excessive permutations.

SUMMARY

Systems and methods for a scalable test model for a cellular communications system having multiple different bandwidth and subcarrier combinations are disclosed. Embodiments of a method performed by a test node and corresponding embodiments of a test node are disclosed. In some embodiments, a method performed by a test node comprises generating a test signal for a particular bandwidth and subcarrier spacing combination, the test signal being in accordance with a test model that is scalable for a plurality of different bandwidth and subcarrier spacing combinations. By using the scalable test model, the test model can be flexibly used to test for different bandwidth and subcarrier spacing combinations.

In some embodiments, the test node is part of a radio node. In some embodiments, the method further comprises transmitting, by the radio node, the test signal.

In some embodiments, the test node is emulated by test equipment that is external to a radio node that is to transmit the test signal. In some embodiments, the method further comprises providing the test signal to the radio node for transmission by the radio node.

In some embodiments, only Physical Downlink Shared Channel (PDSCH), Physical Downlink Control Channel (PDCCH), and one or more selected reference signals are included in the scalable test model. Further, the scalable test model uses a fixed number of Control Channel Elements (CCEs) for bandwidth independent PDCCH size such that PDSCH, but not PDCCH, scales in bandwidth. In some embodiments, the fixed number of CCEs is 1.

In some embodiments, the test signal comprises a first number of spaces filled by a first component and a second number of spaces filled by a second component. In some embodiments, the second component is substantially similar to the first component according to an amplitude statistics criterion. In some embodiments, the amplitude statistics criterion is a Rayleigh distribution or a Complementary Cumulative Distribution Function (CCDF) curve. In some embodiments, the first component is a PDCCH component, and the second component is a PDSCH component.

In some embodiments, the first number of spaces is a fixed number of CCEs for all of the plurality of different bandwidth and subcarrier spacing combinations, and the second number of spaces is scalable for the plurality of different bandwidth and subcarrier spacing combinations. In some embodiments, the fixed number of CCEs is 1 CCE. In some embodiments, the second number of spaces is a remaining number of CCEs allowed by the particular bandwidth and subcarrier spacing combination. In some other embodiments, the second number of spaces is a remaining number of Resource Blocks (RBs) in Orthogonal Frequency Division Multiplexing (OFDM) symbols occupied by the fixed number of CCEs for the particular bandwidth and subcarrier spacing combination.

In some embodiments, the first number of spaces is a first number of CCEs, a first number of Resource Elements (REs), or a first number of RBs, and the second number of spaces is a second number of CCEs, a second number of REs, or a second number of RBs.

In some embodiments, the first number of spaces or the second number of spaces are chosen, at least in part, based on a bandwidth configuration.

In some embodiments, as the subcarrier spacing of the bandwidth and subcarrier spacing combination increases, the number of available spaces for the second component changes.

In some embodiments, as the subcarrier spacing of the bandwidth and subcarrier spacing combination increases, the number of available spaces for the second component changes in a predefined manner.

In some embodiments, the test model is scalable for the plurality of different bandwidth and subcarrier spacing combinations based on a limited number of input parameters. In some embodiments, the input parameters comprise PDSCH parameters. In some embodiments, the input parameters comprise a parameter that a fixed short PDCCH is to be used. In some embodiments, the fixed short PDCCH is 1 CCE. In some embodiments, only PDSCH, PDCCH, and one or more selected reference signals are included in the scalable test model.

In some embodiments, the test model is such that there is up to floor(BW_in_PRB/(6AL)) PDCCHs in one OFDM symbol of the test signal, where BW_in_PRB is a bandwidth of the test signal expressed as a number of Physical Resource Blocks (PRBs) and 6AL is a number of RBs that is equal to 6 times an Aggregation Level (AL) used for the PDCCHs.

In some embodiments, the test model is such that, when the bandwidth of the test signal is less than 6AL RBs where 6AL is equal to 6 times an AL used for a PDCCH in the test signal, the test signal comprises only one PDCCH, and this one PDCCH is distributed over a number of OFDM symbols that is equal to ceil (6AL/BW_in_RB_rounded_down_to_next_multiple_of_6RB), where BW_in_RB_rounded_down_to_next_multiple_of_6RB is the bandwidth of the test signal expressed as a number of RBs rounded down to a next multiple of 6 RBs.

Embodiments of a test node are also disclosed. In some embodiments, a test node is adapted to generate a test signal for a particular bandwidth and subcarrier spacing combination, the test signal being in accordance with a test model that is scalable for a plurality of different bandwidth and subcarrier spacing combinations.

In some embodiments, a test node or system that implements a test node comprises processing circuitry operable to cause the test node to generate a test signal for a particular bandwidth and subcarrier spacing combination, the test signal being in accordance with a test model that is scalable for a plurality of different bandwidth and subcarrier spacing combinations.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
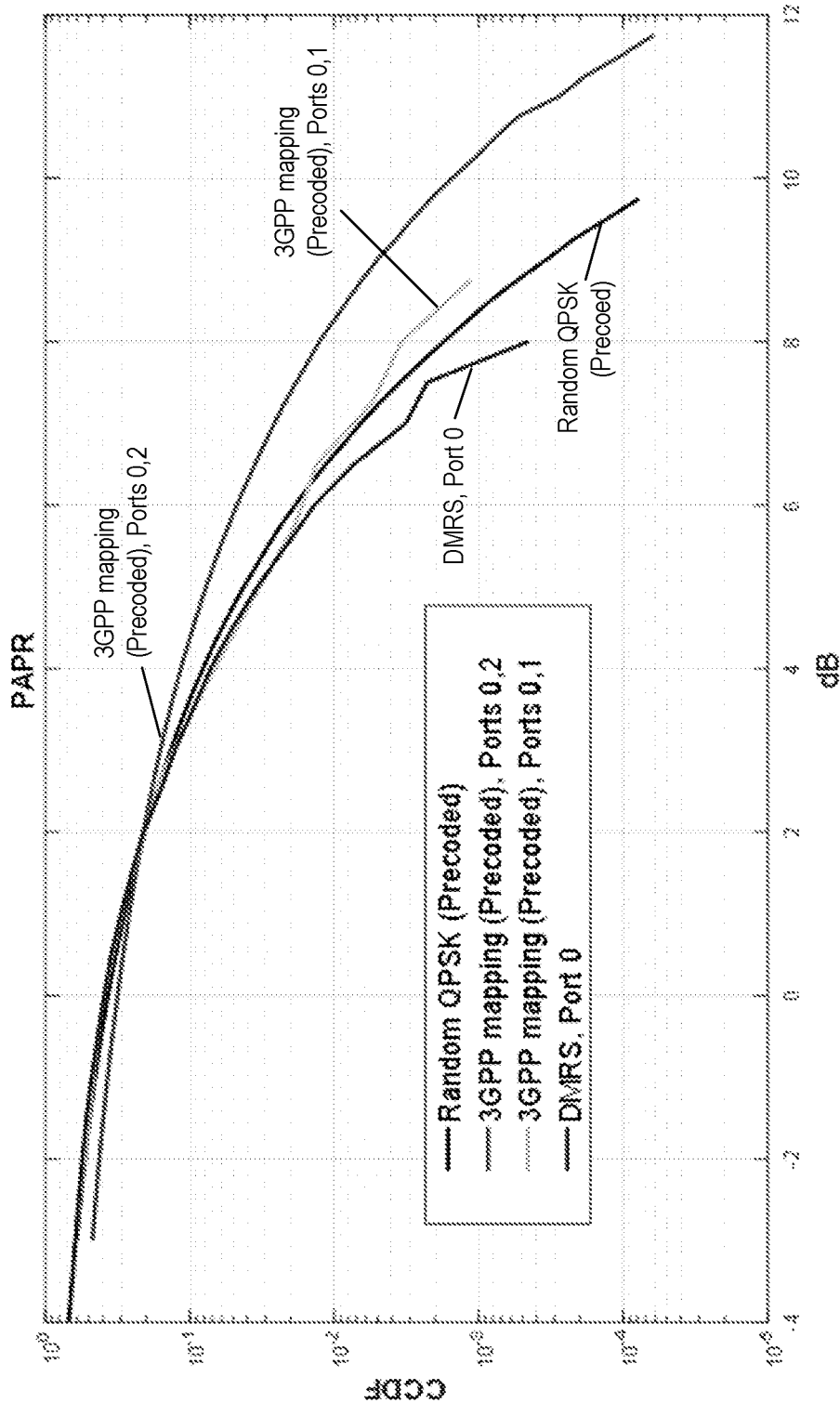
FIG. 1 shows the apparent differences in Peak-to-Average Power Ratio (PAPR) levels for different port mappings of the Demodulation Reference Signal (DMRS)

The embodiments set forth below represent information to enable those skilled in the art to practice the embodiments and illustrate the best mode of practicing the embodiments.

Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) with respect to defining Test Models (TMs) for 3GPP NR. One solution is to provide NR TMs based on LTE; that is, to provide individual detailed tables for every NR bandwidth and Subcarrier Spacing (SCS) combination including multi-numerology. This would entail using the LTE framework for 15 kilohertz (kHz) SCS and expanding the concept for 30 kHz and 60 kHz SCS. Additional 120 kHz and 240 kHz SCS and bandwidths would also need to be considered for frequency range 2 (FR2). Compared to LTE, NR will also require different Physical Downlink Control Channel (PDCCH) configurations depending also on carrier bandwidths, upwards to 100 megahertz (MHz) compared to 20 MHz as in LTE. By doing so, this NR TM would increase the permutations of TM design unnecessarily. The number of tables of parameters would be excessively large, and significantly further work would be needed for every additional bandwidth added in the future. Enabling of flexible base station channel bandwidths has been discussed but not implemented in Release 15 but may be added in a later release, which would give rise to thousands of pages of TMs.

Current proposed solutions [1, 2] as starting points do not propose any method or solution to help with simplification of design of TM permutations. In [1], there is more of an assumption to reuse existing solutions as in LTE, but adapt appropriately for NR.

Certain aspects of the present disclosure and their embodiments may provide solutions to the aforementioned or other challenges. The present disclosure provides embodiments of a solution that, instead of specifying individual TMs for every SCS and bandwidth combination, specifies a scalable parameterization that can be specified in a straightforward manner and can scale to any applicable test combination (i.e., scale to any applicable bandwidth and SCS combination). This can be achieved by (i) including a minimum number of physical channels in the specification, possibly only PDCCH and Physical Downlink Shared Channel (PDSCH) and associated reference signals and (ii) specifying a fixed Control Channel Element (CCE) for bandwidth independent PDCCH size, such that only the PDSCH would scale in bandwidth.

In some embodiments, a test model framework is provided that scales to produce an input signal description for any bandwidth and SCS combination based on a limited set of input parameters. In some embodiments, the input parameters are PDSCH parameters. In some embodiments, the fixed short PDCCH (1 CCE only) is used.

In some embodiments, certain parameters may be used to ensure that regardless of how the test model is scaled, the output of the test model can be reproduced in different test facilities. One example of this is where a random seed is used to generate the data values for each bandwidth and SCS combination. To ensure greater diversity between different bandwidth and SCS combination tests, the random seed could be a function of the bandwidth and SCS.

In some embodiments, a TM with only PDSCH and PDCCH as part of the design with a few selected Reference Signals (RSs) is provided. The RSs likely chosen are those that are frequent in time and frequency, those that are infrequent by design may be considered as not needed to be considered for the TM. Unlike in LTE where all channels and RSs were included in the TM design, the idea of this scalable TM described herein is to keep a minimalist approach.

Embodiments of the present disclosure provide a scalable parameterization TM design to produce input signal description for any bandwidth and SCS combination.

A generic and parameterized TM design for 5G NR (or other suitable cellular communications technologies) with a single framework for all numerologies (bandwidths and SCS combinations) is disclosed herein. The design allows for any manufacturer supported numerology without any restrictions for forced bandwidth or SCS to be supported in order for conformance testing to be applied.

Certain embodiments may provide one or more of the following technical advantage(s). The benefit of this design is that a simple physical layer design allows for one generic and parameterized TM design to be used for all Radio Frequency (RF) conformance tests. This would allow for simplicity whilst not sacrificing test coverage from a physical layer perspective. Since it's envisioned that more bandwidths or frequency ranges will be added, this solution would lend itself to be future proof.

TMs in LTE Versus NR

A possible solution is to take the framework applied in LTE, but remove the channels that do not exist for NR and further exclude NR channels that are not necessary and make the needed adaptations. Below is an excerpt from 3GPP Technical Specification (TS) 36.141. As can be seen, this table would have to expand to cover the many more bandwidth combinations up to 100 MHz for FR1, and 400 MHz in FR2 while for LTE bandwidth covers up to 20 MHz and is why the maximum column in Table 6.1.1.1-1 reflects this. If we imagine all bandwidth combinations in NR for both FR1 and FR2, the columns below would need to be expanded for just a single numerology.

TABLE 6.1.1.1-1

Physical channel parameters of E-TM1.1

| Parameter | 1.4 MHz | 3 MHz | 5 MHz | 10 MHz | 15 MHz | 20 MHz |
|---|---|---|---|---|---|---|
| Reference, Synchronisation Signals | | | | | | |
| RS boosting, $P_B = E_B/E_A$ | 1 | 1 | 1 | 1 | 1 | 1 |
| Synchronisation signal $EPRE/E_{RS}$ [dB] | 0.000 | 0.000 | 0.000 | 0.000 | 0.000 | 0.000 |
| Reserved $EPRE/E_{RS}$ [dB] | -inf | -inf | -inf | -inf | -inf | -inf |
| PBCH | | | | | | |
| PBCH $EPRE/E_{RS}$ [dB] | 0.000 | 0.000 | 0.000 | 0.000 | 0.000 | 0.000 |
| Reserved EPRE/ERS [dB] | -inf | -inf | -inf | -inf | -inf | -inf |
| PCFICH | | | | | | |
| # of symbols used for control channels | 2 | 1 | 1 | 1 | 1 | 1 |
| PCFICH $EPRE/E_{RS}$ [dB] | 3.222 | 0 | 0 | 0 | 0 | 0 |
| PHICH | | | | | | |
| # of PHICH groups | 1 | 1 | 1 | 2 | 2 | 3 |
| # of PHICH per group | 2 | 2 | 2 | 2 | 2 | 2 |
| PHICH BPSK symbol power/$E_{RS}$ [dB] | -3.010 | -3.010 | -3.010 | -3.010 | -3.010 | -3.010 |
| PHICH group $EPRE/E_{RS}$ [dB] | 0 | 0 | 0 | 0 | 0 | 0 |
| PDCCH | | | | | | |
| # of available REGs | 23 | 23 | 43 | 90 | 140 | 187 |
| # of PDCCH | 2 | 2 | 2 | 5 | 7 | 10 |
| # of CCEs per PDCCH* | 1 | 1 | 2 | 2 | 2 | 2 |
| # of REGs per CCE | 9 | 9 | 9 | 9 | 9 | 9 |
| # of REGs allocated to PDCCH | 18 | 18 | 36 | 90 | 126 | 180 |
| # of <NIL> REGs added for padding | 5 | 5 | 7 | 0 | 14 | 7 |
| PDCCH REG $EPRE/E_{Rs}$ [dB] | 0.792 | 2.290 | 1.880 | 1.065 | 1.488 | 1.195 |
| <NIL> REG $EPRE/E_{RS}$ [dB] | -inf | -inf | -inf | -inf | -inf | -inf |
| PDSCH | | | | | | |
| # of QPSK PDSCH PRBs which are boosted** | 6 | 15 | 25 | 50 | 75 | 100 |
| PRB $P_A = E_A/E_{RS}$ [db] | 0 | 0 | 0 | 0 | 0 | 0 |
| # of QPSK PDSCH PRBs which are de-boosted | 0 | 0 | 0 | 0 | 0 | 0 |
| PRB $P_A = E_A/E_{RS}$ [dB] | n.a. | n.a. | n.a. | n.a. | n.a. | n.a. |

As indicated by the "*" above, the PDCCH is a key aspect that would need to be altered dependent on bandwidth. For FR1, this along with three additional SCSs alone would be a large number of TMs for only the physical layer aspect. From TM in FR2 this would also change as bandwidths are larger and go up to 400 MHz with additional two SCSs (120 and 240 kHz).

As indicted by "**" above, for PDSCH, there is a simple calculation of the remaining Resource Elements (REs) that are not filled with PDCCH in the first two symbol slots and are to be filled with PDSCH (or remaining PDCCH is also an alternative). In embodiments of the scalable TM design disclosed herein, the need to specify the exact number of PDSCH Physical Resource Blocks (PRBs) is eliminated, as it will be the remainder of the spaces that the PDCCH (1 CCE) takes up.

TMs Design Figure of Merit

From an RF testing point of view, the metric for an acceptable TM design is the Peak-To-Average Power Ratio (PAPR) of all REs should have a Complementary Cumulative Distribution Function (CCDF) of a Rayleigh distribution. Due to the non-ideal behavior of RF front end components such as Power Amplifiers (PAs), above a given power threshold, the spectrum of the output waveform would contain new spectral components within and outside of the band of frequencies of the input waveform. Ideally, a PA would act linearly on a given input waveform such that the output power would increase linearly in proportion to the input power for all power levels and there would be no spectral growth. However, in practice, for a given instantaneous power of the input waveform above a certain threshold level, the PA is driven to operate nonlinearly on the input waveform such that the power of the output waveform would have spectral components that did not exist in the input waveform. Some algorithms are designed and in place to ensure a threshold of PAPR is ensured; however, these known techniques come at a cost such as overall throughput performance degradation or higher out of band emissions. In the case of higher out of band emissions, this could lead to a failing of other conformance (and some regulatory) requirements.

In multicarrier waveforms such as Orthogonal Frequency Division Multiplexing (OFDM), PAPR is used to determine the PA's back-off level to maintain its linearity. A higher PAPR level requires a higher back-off which in turn implies reduced efficiency of the PA. Therefore, a waveform's PAPR level needs to be maintained within a level for efficient operation of the PA. In NR, different aspects of the transmitted waveform can influence the PAPR level. For example, FIG. 1 shows the apparent differences in PAPR levels for different port mappings of the Demodulation Reference Signal (DMRS).

In LTE, the power distribution between REs was not equal, and Cell Specific Reference Signals (CRSs) had high power levels compared to that of the data signals. For certain features, a boosting or de-boosting of certain PRBs was also needed. These power variations in the physical layer cause issues during testing RF requirements.

NR TM Framework and Solution

Figure 2:
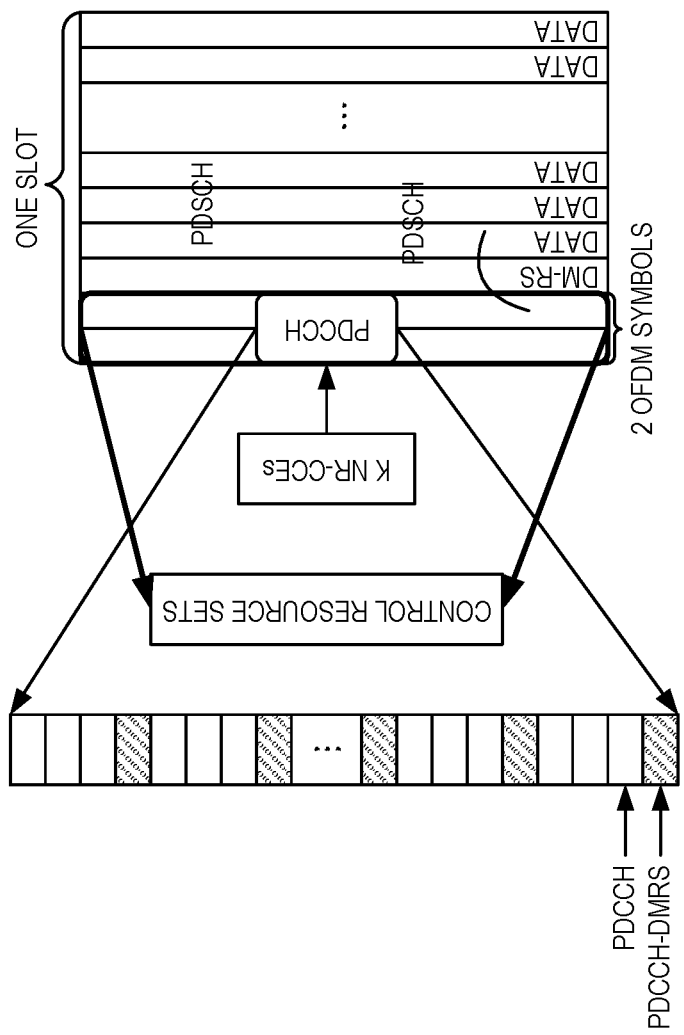
FIG. 2 illustrates a Physical Downlink Control Channel (PDCCH) and Physical Downlink Shared Channel (PDSCH) Configuration used for Test Model (TM) design which does not cover all configurations in terms of PAPR.

FIG. 2 illustrates a PDCCH and PDSCH Configuration used for TM design which does not cover all configurations in terms of PAPR. In the structure shown in FIG. 2, PDCCH can use one CCE, the smallest PDCCH configuration supported. One CCE corresponds to 72 REs. Depending on the PDCCH configuration (the Control Channel Resource Set (CORESET) configuration), a PDCCH can span 1, 2, or 3 symbols and accordingly more or less resources in the frequency domain. In this case, the first two symbols are only occupied by PDCCH (and the associated DMRS); all other subcarriers are empty.

Figure 3:
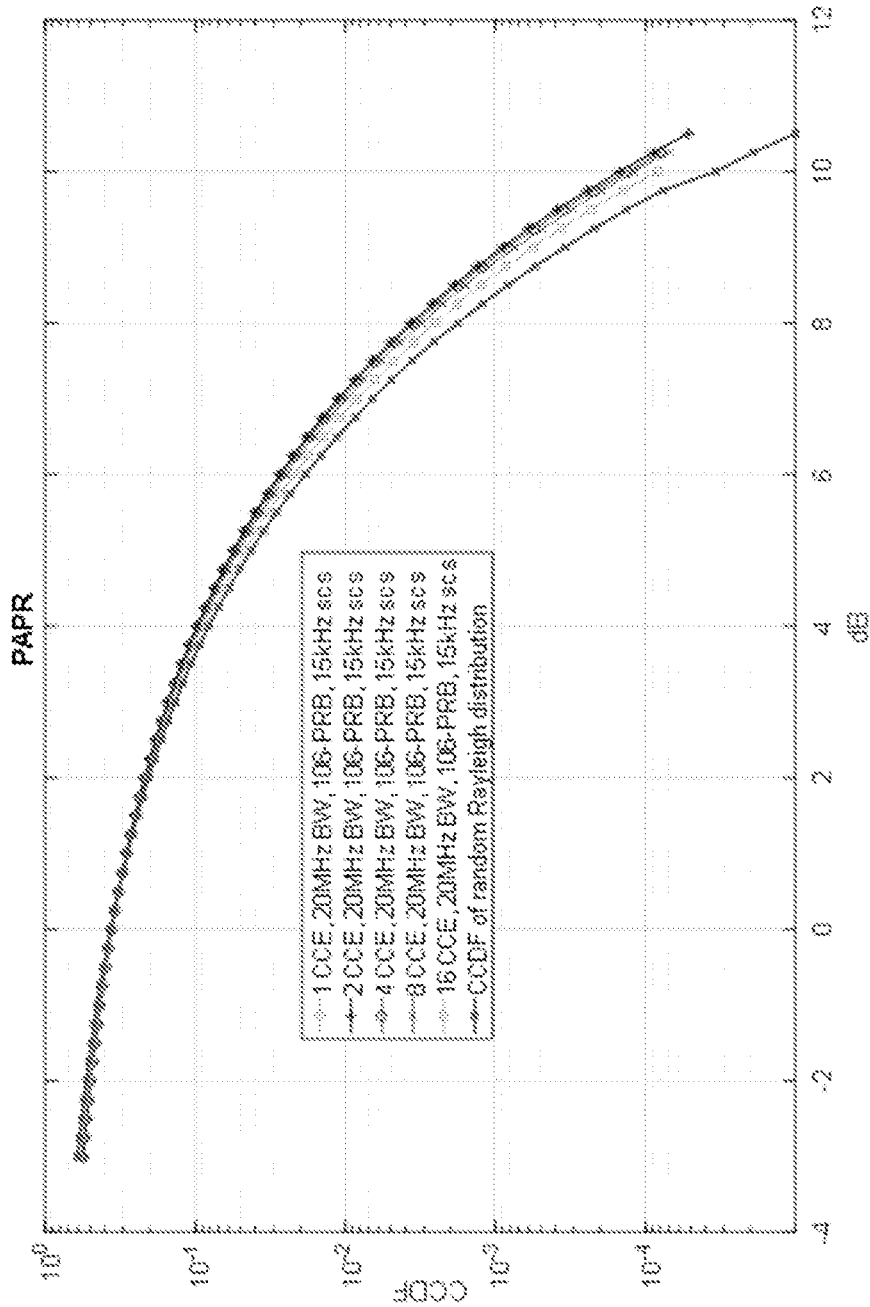
FIG. 3 illustrates Complementary Cumulative Distribution Function (CCDF) curves of a waveform of 20 Megahertz (MHz) bandwidth according to the structure in FIG. 2 for various Control Channel Element (CCE) aggregation levels relative to CCDF of a Rayleigh distributed set of samples.
Figure 4:
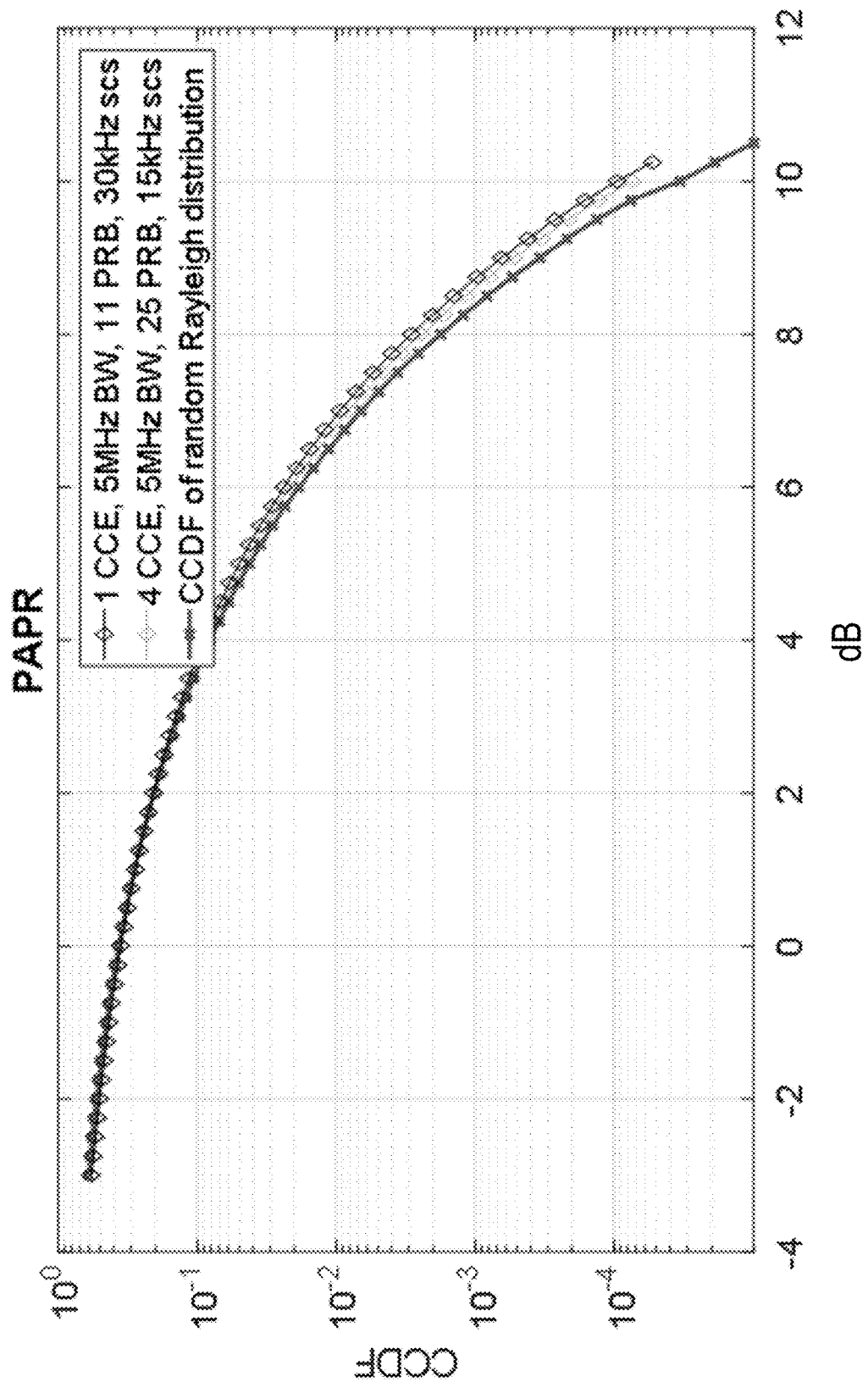
FIG. 4 illustrates CCDF curves of a waveform of 5 MHz bandwidth according to the structure in FIG. 2 for aggregation levels of 1-CCE at 30 kilohertz (kHz) Subcarrier Spacing (SCS) and 4-CCE at 15 kHz SCS relative to CCDF of a Rayleigh distributed set of samples.

The slight PAPR increase due to the first two symbols that are only partly occupied is shown in FIGS. 3 and 4. FIG. 3 illustrates CCDF curves of a waveform of 20 MHz bandwidth according to the structure in FIG. 2 for various CCE aggregation levels relative to CCDF of a Rayleigh distributed set of samples. FIG. 4 illustrates CCDF curves of a waveform of 5 MHz bandwidth according to the structure in FIG. 2 for aggregation levels of 1-CCE at 30 kHz SCS and 4-CCE at 15 kHz SCS relative to CCDF of a Rayleigh distributed set of samples.

In NR, several empty subcarriers can be filled with either PDSCH or PDCCH in remaining subcarriers that do not contain PDCCH. In the plots in FIGS. 3 and 4 covering two different bandwidths with 15 kHz SCS, the first two symbols are only allocated to PDCCH. However, although the PAPR increase is not large there is still room for further improvement.

To further reduce the PAPR, another option would be to increase the PDCCH to four CCEs; however, this would imply two different TM configurations as the cases (SCS and bandwidth combination) which contain less than 24 PRBs would only be feasible to support one and/or two CCEs. FIG. 4 demonstrates the reduction in PAPR for the case of 5 MHz bandwidth with 15 kHz SCS utilizing the four CCE TM, and the 5 MHz bandwidth with 30 kHz SCS utilizing the one CCE scenario. Since the 30 kHz SCS contains only 11 PRBs, a reduction of CCEs needs to be applied.

Figure 5:
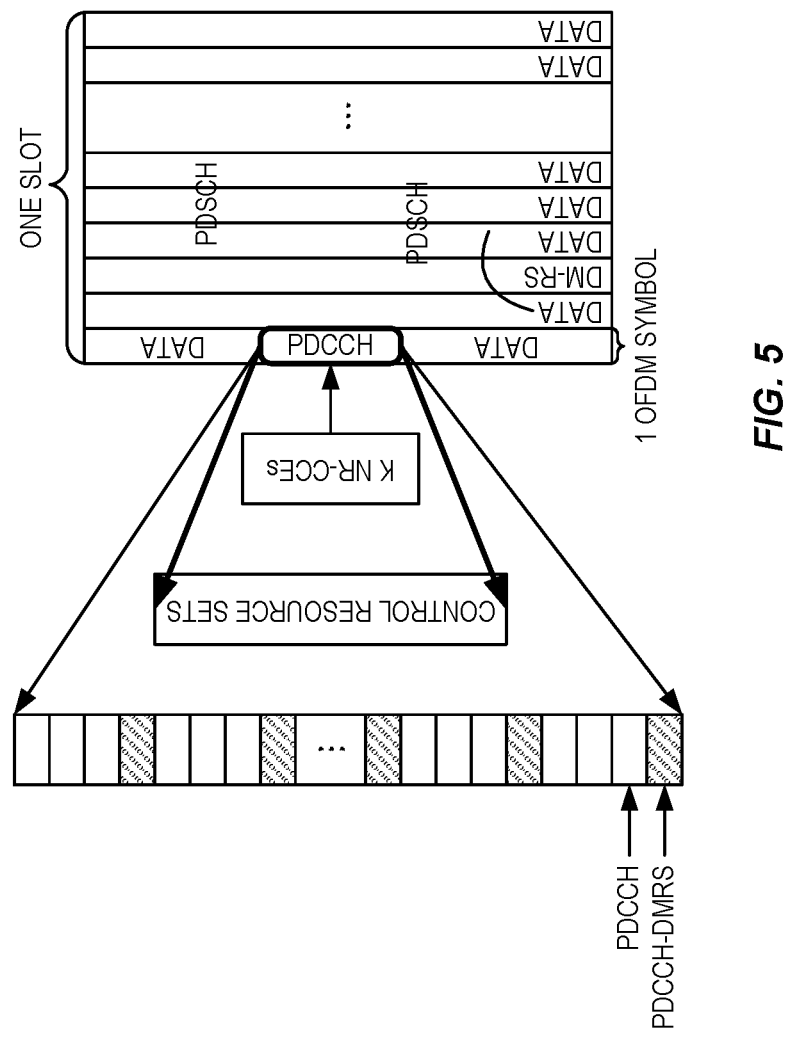
FIG. 5 illustrates a PDCCH and PDSCH Configuration used for a TM design which covers almost all configurations in terms of PAPR.

For LTE, the PDCCH would be reserved in the first two symbols (#0 and #1) in each subframe. This also creates the need to ensure different CCE configurations to properly design a TM to meet PAPR aspects. For NR, physical layer design provides the flexibility for PDSCH to occupy (some of) the remaining subcarriers in the first symbol while the second symbol and onwards are also fully occupied by PDSCH as shown in FIG. 5. FIG. 5 illustrates a PDCCH and PDSCH Configuration used for simple TM design which covers almost all configurations in terms of PAPR.

Figure 6:
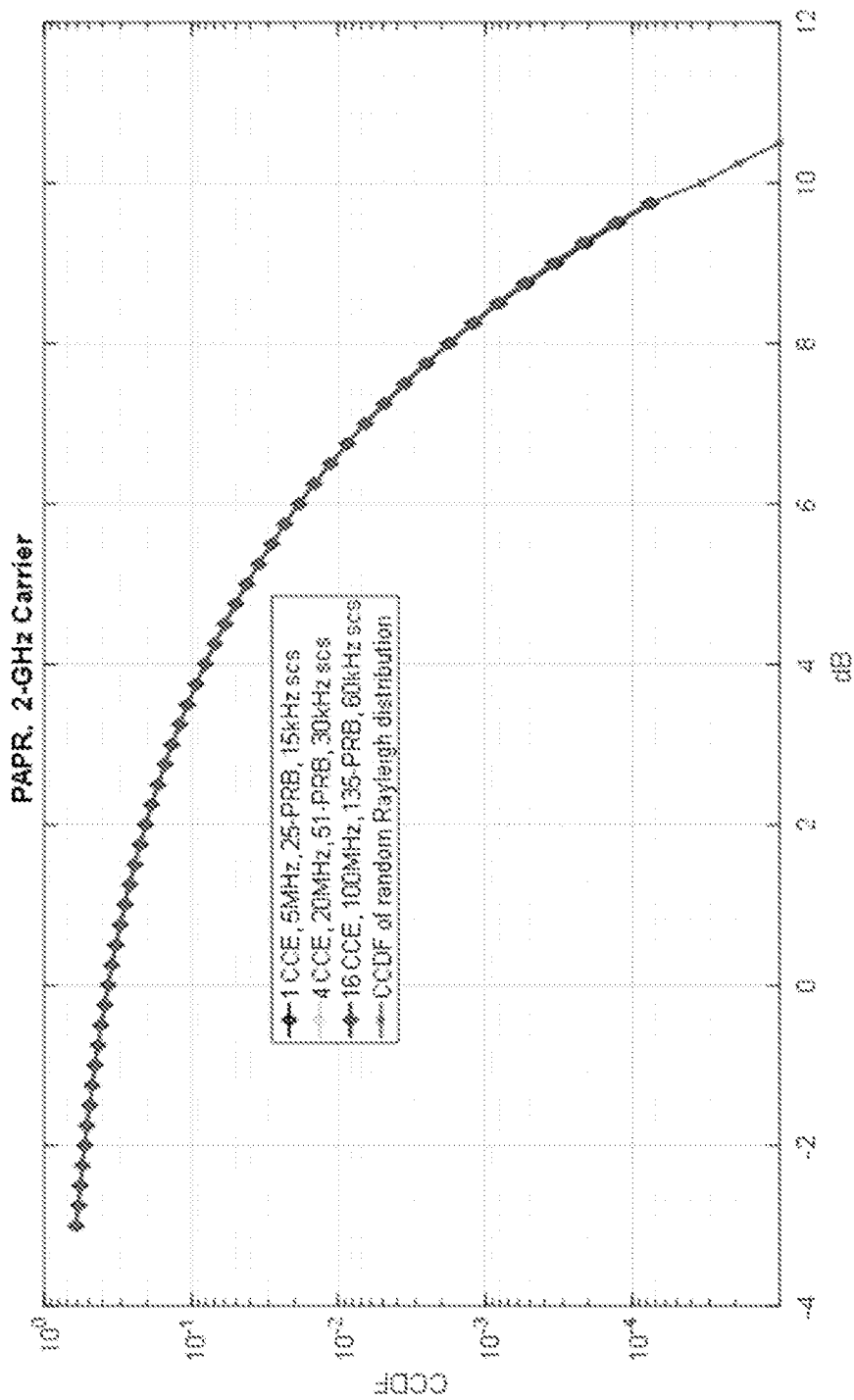
FIG. 6 illustrates CCDF curves of waveform for three random CCE aggregation level-bandwidth-SCS configurations according to the structure in FIG. 5 relative to CCDF of a Rayleigh distributed set of samples.

This aspect helps to further reduce the PAPR. As can be shown in FIG. 6, the different CCE combinations do not make an impact. FIG. 6 illustrates CCDF curves of waveform for three random CCE aggregation level-bandwidth-SCS configurations according to the structure in FIG. 5 relative to CCDF of a Rayleigh distributed set of samples.

To avoid PAPR increase (at least to a large extent) due to empty subcarriers in the PDCCH symbols, it can therefore be envisioned 1) to enable multiplexing of PDSCH into PDCCH symbols or 2) to specify a PDCCH with a larger aggregation level and the CORESET shape (CORESET bandwidth, number of symbols) depends on the bandwidth and SCS (i.e., number of subcarriers in the channel bandwidth). One drawback with the latter approach is that a PDCCH configuration that is slightly too large for one symbol would require two symbols, each symbol approximately half utilized. It can be considered to combine this approach with multiplexing of PDSCH into PDCCH symbols to fill up empty subcarriers.

Figure 7:
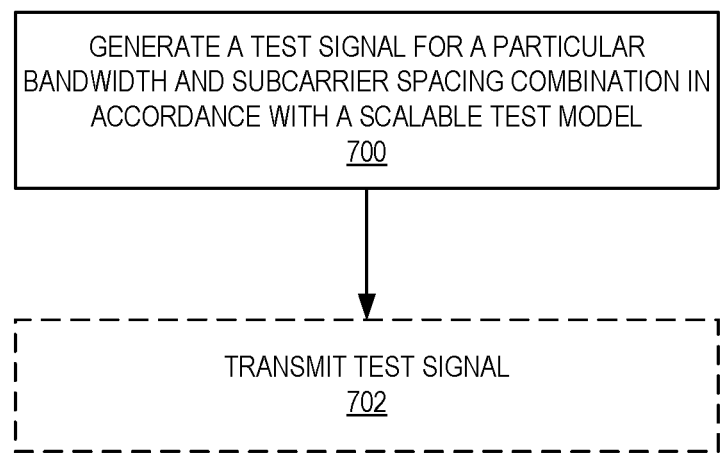
FIG. 7 is a flow chart that illustrates a process for utilizing a scalable TM in accordance with some embodiments of the present disclosure.

FIG. 7 is a flow chart that illustrates a process for utilizing a scalable TM having the scalable TM design described above in accordance with some embodiments of the present disclosure. As illustrated, a test signal is generated for a particular bandwidth and SCS combination in accordance with the scalable TM (step 700). For instance, the scalable TM may be predefined, e.g., by an appropriate standard. This scalable TM is scaled based on the particular bandwidth and SCS combination to provide respective configuration parameters for the test signal. The test signal is generated using these configuration parameters. The test signal is transmitted by a radio node (e.g., a radio access node such as, e.g., a gNB or a wireless device such as, e.g., a UE for a NR network) (step 702).

Note that, in some embodiments, step 700 is performed by a test node. The test node could be part of a radio node (e.g., part of a digital unit (e.g., control system) of a base station or other radio node) or emulated by test equipment that is external to the radio node (e.g., emulated by test equipment that is external to a base station or other radio node). Further, in some embodiments, some aspects of step 700 may be performed by an external test node (e.g., an external test node scales the scalable TM based on the particular bandwidth and SCS combination and provides the resulting configuration parameters to the radio node) and a separate internal test node (i.e., a test node within, e.g., a digital unit or control system of a radio node) then performs other aspects of step 700 (e.g., generating the test signal based on the configuration parameters).

In some embodiments, the test signal has a first number of spaces (e.g., CCEs/REs/RBs) filled by a first component (e.g., PDCCH) and a second number of spaces filled by a second component (e.g., PDSCH), wherein the second component is substantially similar to the first component according to an amplitude statistics criterion (e.g., Rayleigh distribution, CCDF curve, see FIG. 6). In some embodiments, the first number of spaces and the second number of spaces are chosen, at least in part, based on the bandwidth configuration of the first component. For example, PDCCH CCE is fixed to 1, whilst the bandwidth configuration allows for more CCEs. The remaining CCEs allowed by the bandwidth configuration are filled with a second component, e.g., PDSCH. As the remaining bandwidth configuration may increase while only 1 CCE for PDCCH may need to be used in the test signal, more CCEs are available for PDSCH. Thus, the number of CCEs filled with PDSCH scales up with increasing bandwidth. In one embodiment, as subcarrier spacing combination increases, the number of available spaces for the second component may change, for example based on a standard such as, e.g., the 3GPP TS 38.104 specification.

In one embodiment, a PDCCH with a certain Aggregation Level (AL), e.g. 4, which may stay fixed (4, in the given example) or may scale with bandwidth, i.e. BW<=BW1: AL1, BW1<BW<=BW2: AL2, BW2<BW<=BW3: AL3, . . . .

Then, for a certain bandwidth, the AL can be used according to scaling rules as noted above or can be a fixed AL. In addition, the CORESET bandwidth scales such that it (almost) fills up one OFDM symbol by widening the CORESET for additional PDCCH. For example, assume aggregation level AL is used for PDCCH (i.e., PDCCH consists of AL CCE), and 1 CCE consists of 6 RBs, so one PDCCH needs 6 AL RBs. The CORESET bandwidth is, in this case, floor(BW_in_RB/(6AL))*6AL. In this case, according to one embodiment, the test model may contain floor(BW_in_PRB/(6AL)) PDCCH in one OFDM symbol.

For the case when BW_in_PRB is less than 6 AL RBs, a small AL can be used (according, e.g., to BW<=BW1: AL1, BW1<BW<=BW2: AL2, BW2<BW<=BW3: AL3). Alternatively, there can be only one PDCCH which is distributed over ceil (6AL/BW_in_RB_rounded_down_to_next_multiple_of_6RB) symbols (in some embodiments, a CORESET must be n*6RB, where n is a positive integer, therefore BW_in_RB_rounded_down_to_next_ multiple_ of_6RB and not BW_in_RB is used).

In both cases, the remaining RB can either be left empty or used for PDSCH.

Figure 8:
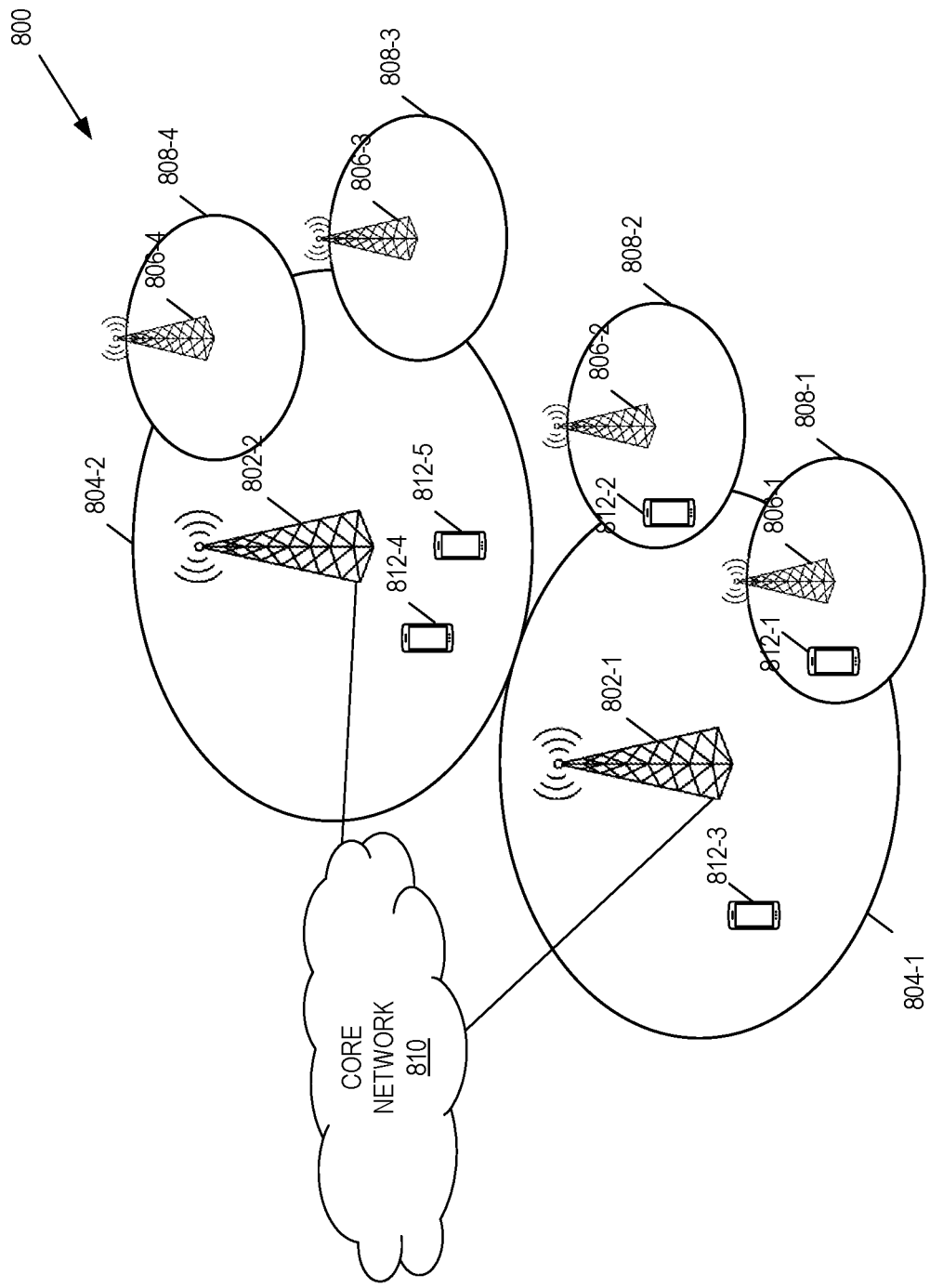
FIG. 8 illustrates one example of a cellular communications network according to some embodiments of the present disclosure.

FIG. 8 illustrates one example of a cellular communications network 800 according to some embodiments of the present disclosure. In the embodiments described herein, the cellular communications network 800 is a 5G NR network. In this example, the cellular communications network 800 includes base stations 802-1 and 802-2, which in 5G NR are referred to as gNBs, controlling corresponding macro cells 804-1 and 804-2. The base stations 802-1 and 802-2 are generally referred to herein collectively as base stations 802 and individually as base station 802. Likewise, the macro cells 804-1 and 804-2 are generally referred to herein collectively as macro cells 804 and individually as macro cell 804. The cellular communications network 800 may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The base stations 802 (and optionally the low power nodes 806) are connected to a core network 810.

The base stations 802 and the low power nodes 806 provide service to wireless devices 812-1 through 812-5 in the corresponding cells 804 and 808. The wireless devices 812-1 through 812-5 are generally referred to herein collectively as wireless devices 812 and individually as wireless device 812. The wireless devices 812 are also sometimes referred to herein as UEs.

The scalable TM described above can be used to perform testing of the base stations 802, the low power nodes 806, and/or the wireless devices 812, e.g., in accordance with the method of FIG. 7.

Figure 9:
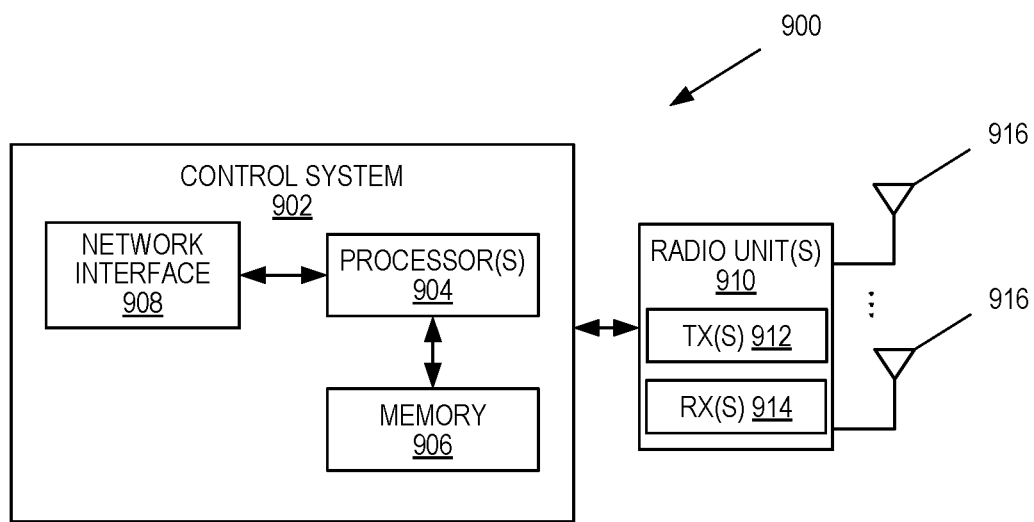
FIG. 9 is a schematic block diagram of a radio access node according to some embodiments of the present disclosure.

FIG. 9 is a schematic block diagram of a radio access node 900 according to some embodiments of the present disclosure. The radio access node 900 may be, for example, a base station 802 or 806. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 includes one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
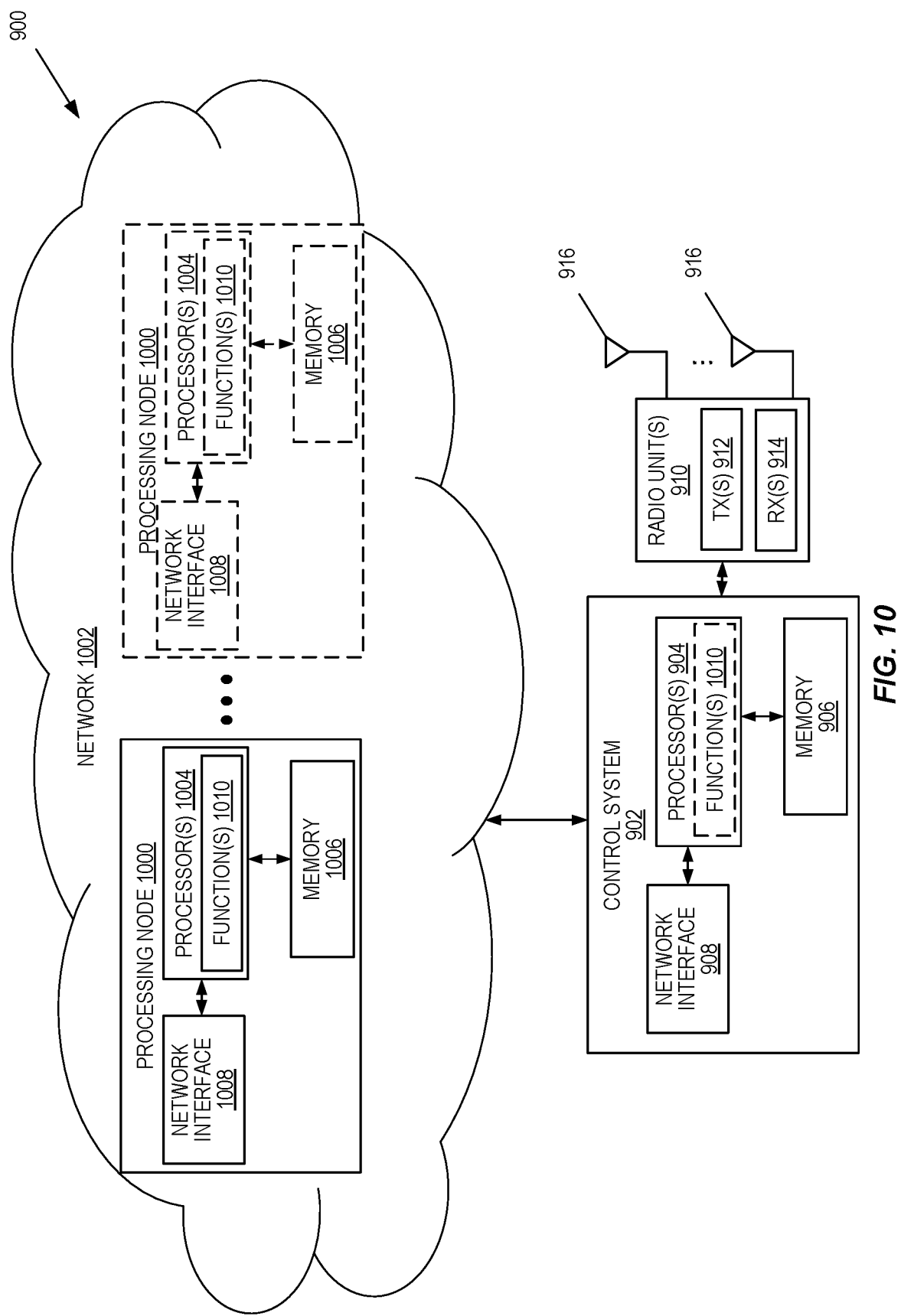
FIG. 10 is a schematic block diagram that illustrates a virtualized embodiment of the radio access node according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
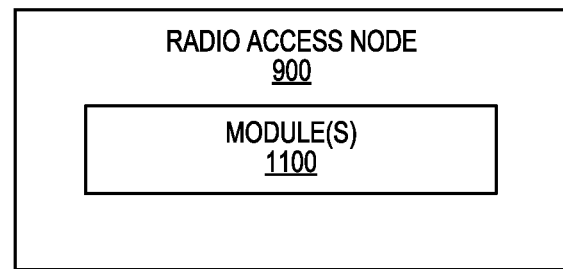
FIG. 11 is a schematic block diagram of the radio access node according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
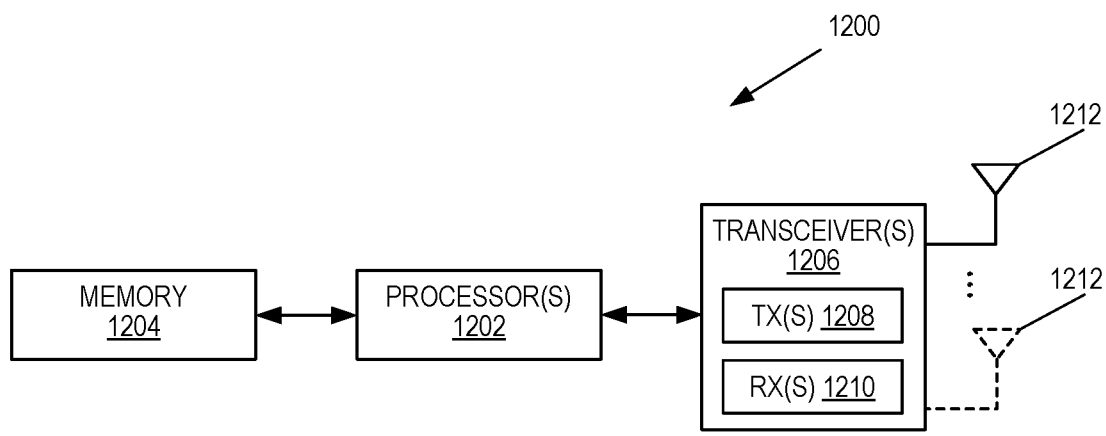
FIGS. 12 and 13 illustrate example embodiments of a User Equipment (UE).

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the UE 1200 described above may be fully or partially implemented in software that is, e.g., stored in the memory 1204 and executed by the processor(s) 1202. Note that the UE 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the UE 1200 and/or allowing output of information from the UE 1200), a power supply (e.g., a battery and associated power circuitry), etc.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
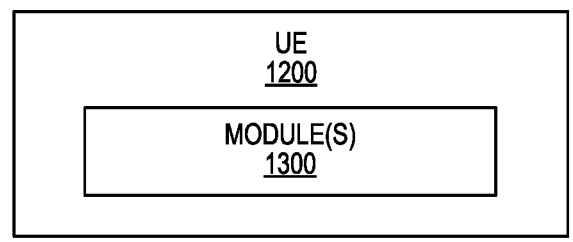

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a test node, the method comprising: generating (700) a test signal for a particular bandwidth and subcarrier spacing combination, the test signal being in accordance with a test model that is scalable for a plurality of different bandwidth and subcarrier spacing combinations.

Embodiment 2: The method of embodiment 1 wherein the test node is part of a radio node (e.g., part of a digital unit of a base station).

Embodiment 3: The method of embodiment 2 further comprising transmitting (702), by the radio node, the test signal.

Embodiment 4: The method of embodiment 1 wherein the test node is emulated by test equipment that is external to a radio node (e.g., a base station or other radio node) that is to transmit the test signal.

Embodiment 5: The method of embodiment 4 further comprising providing the test signal to the radio node for transmission by the radio node.

Embodiment 6: The method of any one of embodiments 1 to 5, wherein the test signal has a first number of spaces (e.g., CCEs/REs/RBs) filled by a first component (e.g., PDCCH) and a second number of spaces (e.g., CCEs/REs/RBs) filled by a second component (e.g., PDSCH), wherein the second component is substantially similar to the first component according to an amplitude statistics criterion (e.g., Rayleigh distribution, CCDF curve, see FIG. 6).

Embodiment 7: The method of embodiment 6 wherein the first number of spaces and the second number of spaces are chosen, at least in part, based on a bandwidth configuration of the first component.

Example: For example, PDCCH CCE is fixed to 1, whilst bandwidth configuration allows for more CCEs. The remaining CCEs allowed by the bandwidth configuration are filled with a second component, e.g., PDSCH. As the remaining bandwidth configuration may increase while only 1 CCE for PDCCH may need to be used in the test signal, more CCEs are available for PDSCH. Thus the number of CCEs filled with PDSCH scales up with increasing bandwidth.

Embodiment 8: The method of embodiment 6 or 7 wherein, as the subcarrier spacing of the bandwidth and subcarrier spacing combination increases, the number of available spaces for the second component changes, e.g., in a predefined manner (e.g., as defined in a standard or specification such as, e.g., 3GPP TS 38.104).

Embodiment 9: The method of any one of embodiments 1 to 8 wherein generating (700) the test signal for the particular bandwidth and subcarrier spacing combination comprises generating (700) the test signal for the particular bandwidth and subcarrier spacing combination in accordance with a plurality of configuration parameters for the particular bandwidth and subcarrier combination derived from the test model.

Embodiment 10: The method of embodiment 9 further comprising receiving the plurality of configuration parameters from an external source.

Embodiment 11: The method of embodiment 9 wherein generating (700) the test signal for the particular bandwidth and subcarrier spacing combination comprises deriving the plurality of configuration parameters for the particular bandwidth and subcarrier combination from the test model.

Embodiment 12: The method of any one of embodiments 1 to 11 wherein the test model is scalable for the plurality of different bandwidth and subcarrier spacing combinations based on a limited number of input parameters.

Embodiment 13: The method of embodiment 12 wherein the input parameters comprise PDSCH parameters.

Embodiment 14: The method of embodiment 12 or 13 wherein the input parameters comprise a parameter that a fixed short PDCCH is to be used.

Embodiment 15: The method of embodiment 14 wherein the fixed short PDCCH is 1 CCE Embodiment 16: The method of any one of embodiments 12 to 15 wherein only PDSCH, PDCCH, and one or more selected reference signals (i.e., not all reference signals) are included in the scalable test model.

Embodiment 17: The method of embodiment 16 wherein the one or more selected reference signals are one or more reference signals that are frequent in time and frequency.

Embodiment 18: A test node adapted to operate in accordance with any one of embodiments 1 to 17.

Embodiment 19: A test node comprising: processing circuitry operable to perform the method of any one of embodiments 1 to 17.

Embodiment 20: A test model that is scalable for a plurality of different bandwidth and subcarrier spacing combinations.

Embodiment 21: The method of embodiment 20 wherein the test model is scalable for the plurality of different bandwidth and subcarrier spacing combinations based on a limited number of input parameters.

Embodiment 22: The method of embodiment 21 wherein the input parameters comprise PDSCH parameters.

Embodiment 23: The method of embodiment 21 or 22 wherein the input parameters comprise a parameter that a fixed short PDCCH is to be used.

Embodiment 24: The method of embodiment 23 wherein the fixed short PDCCH is 1 CCE Embodiment 25: The method of any one of embodiments 20 to 24 wherein only PDSCH, PDCCH, and one or more selected reference signals (i.e., not all reference signals) are included in the test model.

Embodiment 26: The method of embodiment 25 wherein the one or more selected reference signals are one or more reference signals that are frequent in time and frequency.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| AL | Aggregation Level |
| ASIC | Application Specific Integrated Circuit |
| CCDF | Complementary Cumulative Distribution Function |
| CCE | Control Channel Element |
| CORESET | Control Channel Resource Set |
| CP | Cyclic Prefix |
| CPU | Central Processing Unit |
| CRS | Cell Specific Reference Signal |
| DMRS | Demodulation Reference Signal |
| DSP | Digital Signal Processor |
| eNB | Enhanced or Evolved Node B |
| E-UTRA | Evolved Universal Terrestrial Radio Access |
| FPGA | Field Programmable Gate Array |
| GHz | Gigahertz |
| gNB | New Radio Base Station |
| IoT | Internet of Things |
| kHz | Kilohertz |
| LTE | Long Term Evolution |
| MHz | Megahertz |
| MME | Mobility Management Entity |
| ms | Millisecond |
| MTC | Machine Type Communication |
| NR | New Radio |
| OFDM | Orthogonal Frequency Division Multiplexing |
| PA | Power Amplifier |
| PAPR | Peak-To-Average Power Ratio |
| PDCCH | Physical Downlink Control Channel |
| PDSCH | Physical Downlink Shared Channel |
| P-GW | Packet Data Network Gateway |
| PRB | Physical Resource Block |
| RAM | Random Access Memory |
| RAN | Radio Access Network |
| RB | Resource Block |
| RE | Resource Element |
| RF | Radio Frequency |
| ROM | Read Only Memory |
| RRH | Remote Radio Head |
| RS | Reference Signal |
| SCEF | Service Capability Exposure Function |
| SCS | Subcarrier Spacing |
| TM | Test Model |
| TS | Technical Specification |
| UE | User Equipment |
| URLLC | Ultra-Reliable and Low Latency Communication |

Those skilled in the art will recognize improvements and modifications to the embodiments of the present disclosure. All such improvements and modifications are considered within the scope of the concepts disclosed herein.

REFERENCES

[1] R4-1807872, "NR Test models", Nokia, Nokia Shanghai Bell
[2] R4-1807852, "Test models for NR base station conformance testing', Huawei

What is claimed is:
1. A method performed by a test node, the method comprising:
  generating a test signal for a particular bandwidth and subcarrier spacing combination, the test signal being in accordance with a test model that is scalable for a plurality of different bandwidth and subcarrier spacing combinations;
  wherein the test signal comprises a first number of spaces filled by a first component and a second number of spaces filled by a second component;
  the first component being a Physical Downlink Control Channel, PDCCH, component and the first number of spaces being a fixed number of control channel elements, CCEs;

the second component being a Physical Downlink Shared Channel, PDSCH, component and the second number of spaces being a number of resource blocks, RBs, that is scalable based on a bandwidth configuration.

2. The method of claim 1 wherein the fixed number of CCEs is 1.

3. The method of claim 1 wherein the second component is substantially similar to the first component according to an amplitude statistics criterion.

4. The method of claim 3 wherein the amplitude statistics criterion is a Rayleigh distribution or a Complementary Cumulative Distribution Function, CCDF, curve.

5. The method of claim 1 wherein the second number of spaces is a remaining number of RBs allowed by the particular bandwidth and subcarrier spacing combination.

6. The method of claim 1 wherein only PDSCH, PDCCH, and one or more selected reference signals are included in the scalable test model.

7. The method of claim 1 wherein the test model is such that there is up to floor(BW_in_PRB/(6AL)) Physical Downlink Control Channels, PDCCHs, in one Orthogonal Frequency Division Multiplexing, OFDM, symbol of the test signal, where BW_in_PRB is a bandwidth of the test signal expressed as a number of Physical Resource Blocks, PRBs, and 6AL is a number of Resource Blocks, RBs, that is equal to 6 times an Aggregation Level, AL, used for the PDCCHs.

8. The method of claim 1 wherein the test model is such that, when the bandwidth of the test signal is less than 6AL Resource Blocks, RBs, where 6AL is equal to 6 times an Aggregation Level, AL, used for a Physical Downlink Control Channel, PDCCH, in the test signal, the test signal comprises only one PDCCH, and this one PDCCH is distributed over a number of Orthogonal Frequency Division Multiplexing, OFDM, symbols that is equal to:

ceil(6AL/BW_in_RB_rounded_down_to_next_multiple_of_6RB), where BW_in_RB_rounded_down_to_next_multiple_of_6RB is the bandwidth of the test signal expressed as a number of RBs rounded down to a next multiple of 6 RBs.

9. A test node, comprising:

processing circuitry operable to cause the test node to generate a test signal for a particular bandwidth and subcarrier spacing combination, the test signal being in accordance with a test model that is scalable for a plurality of different bandwidth and subcarrier spacing combinations;

wherein the test signal comprises a first number of spaces filled by a first component and a second number of spaces filled by a second component;

the first component being a Physical Downlink Control Channel, PDCCH, component and the first number of spaces being a fixed number of control channel elements, CCEs;

the second component being a Physical Downlink Shared Channel, PDSCH, component and the second number of spaces being a number of resource blocks, RBs, that is scalable based on a bandwidth configuration.

10. The test node of claim 9 wherein the test node is part of a radio node.

11. The test node of claim 9 wherein the test node is emulated by test equipment that is external to a radio node that is used to transmit the test signal.

12. The test node of claim 11 wherein the processing circuitry is further operable to provide the test signal to the radio node for transmission by the radio node.

* * * * *